Figure 1A:
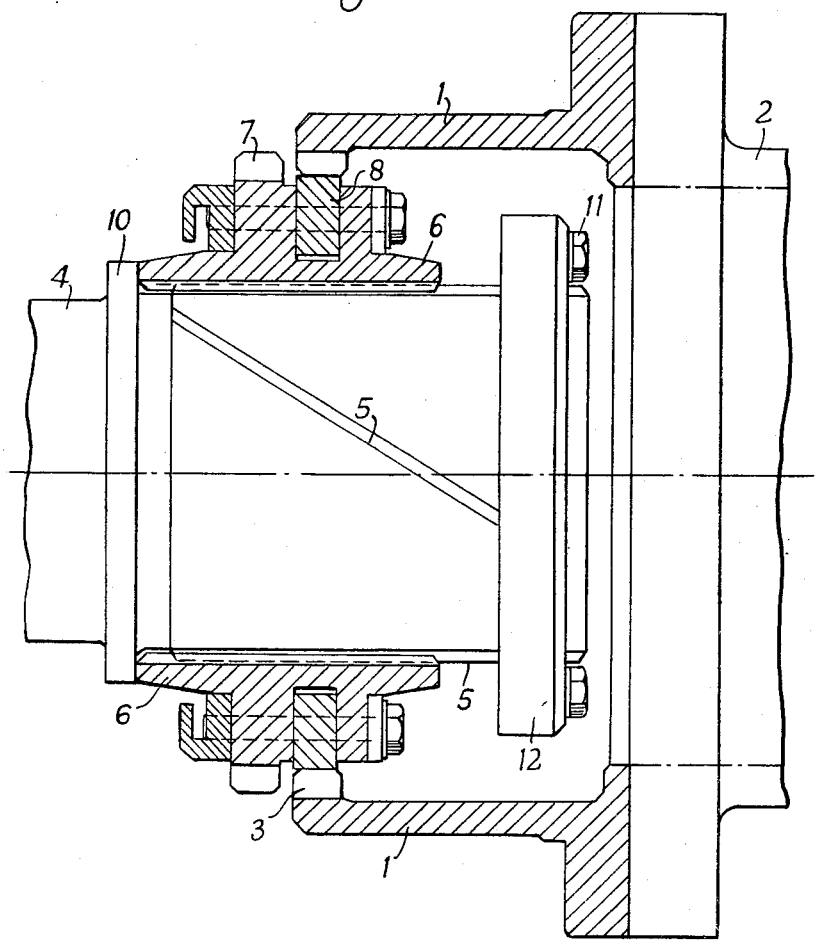

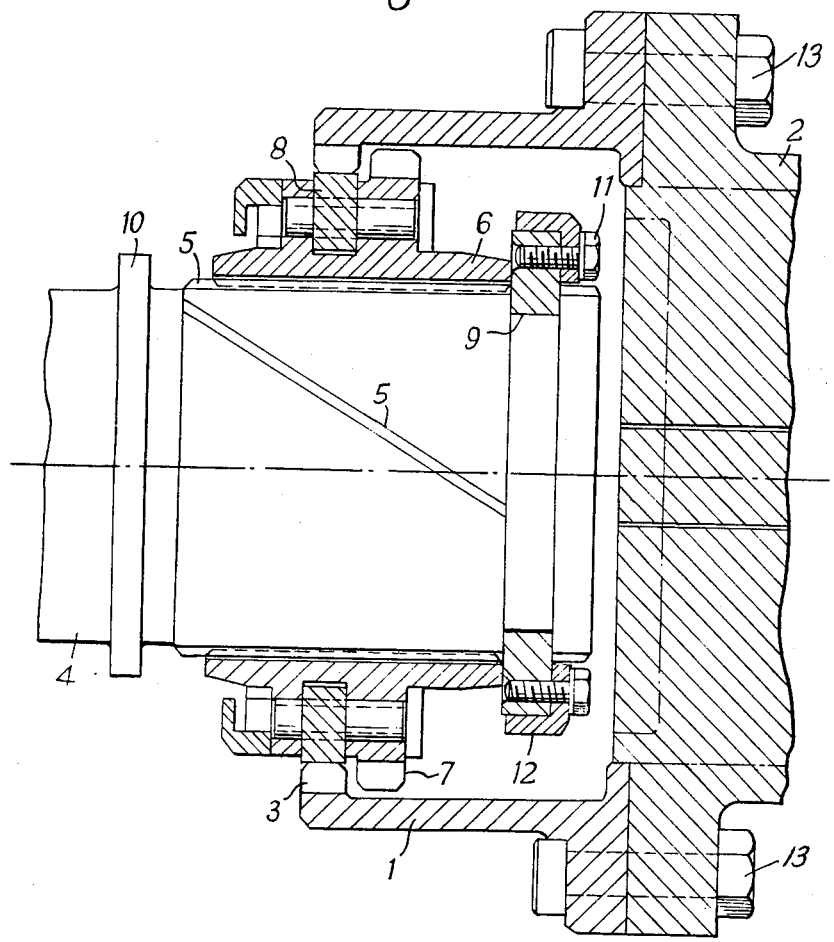

Sept. 14, 1965   H. A. CLEMENTS ETAL   3,205,987
SYNCHRO SELF-SHIFTING CLUTCH WITH INVERTIBLE PARTS
Filed May 8, 1962   9 Sheets-Sheet 2

INVENTOR
HERBERT ARTHUR CLEMENTS
HAROLD SINCLAIR
BY
Benjamin Sweedler
ATTORNEY

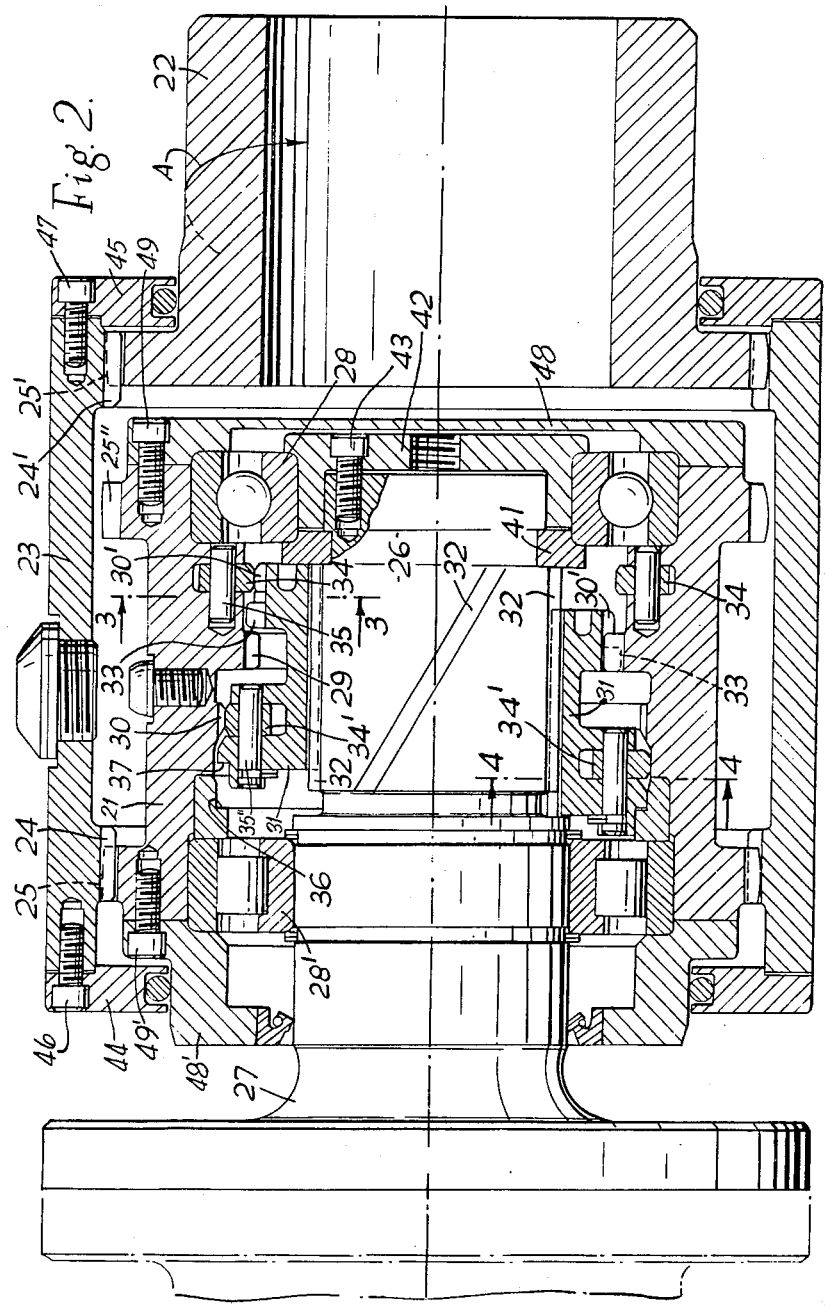

Sept. 14, 1965   H. A. CLEMENTS ETAL   3,205,987
SYNCHRO SELF-SHIFTING CLUTCH WITH INVERTIBLE PARTS
Filed May 8, 1962   9 Sheets-Sheet 4

INVENTOR
HERBERT ARTHUR CLEMENTS
HAROLD SINCLAIR
BY

Benjamin Sweedler
ATTORNEY

Sept. 14, 1965 H. A. CLEMENTS ETAL 3,205,987
SYNCHRO SELF-SHIFTING CLUTCH WITH INVERTIBLE PARTS
Filed May 8, 1962 9 Sheets-Sheet 6

INVENTORS
HERBERT ARTHUR CLEMENTS
HAROLD SINCLAIR
BY
Benjamin Tweedle
ATTORNEY

Sept. 14, 1965    H. A. CLEMENTS ETAL    3,205,987
SYNCHRO SELF-SHIFTING CLUTCH WITH INVERTIBLE PARTS
Filed May 8, 1962                                    9 Sheets-Sheet 9

INVENTORS
HERBERT ARTHUR CLEMENTS
HAROLD SINCLAIR
BY

Benjamin Sweedler
ATTORNEY

United States Patent Office 3,205,987
Patented Sept. 14, 1965

3,205,987
SYNCHRO SELF-SHIFTING CLUTCH WITH INVERTIBLE PARTS
Herbert Arthur Clements, Weybridge, Surrey, and Harold Sinclair, London, England, assignors to S.S.S. Patents Limited, Surrey, England, a British company
Filed May 8, 1962, Ser. No. 193,155
Claims priority, application Great Britain, May 12, 1961, 17,449/61
4 Claims. (Cl. 192—67)

This invention relates to synchronous self-shifting clutches of the type comprising a first clutch member provided with clutch teeth, a second clutch member mounted substantially coaxially with the first clutch member, an intermediate member provided with clutch teeth and constrained for limited helical movement relative to the second clutch member between positions, defined by stops, of toothed engagement with an disengagement from the first clutch member, and coacting means carried respectively by said first and intermediate members for initiating toothed engagement of the intermediate member with the first clutch member upon relative rotation between the first and second clutch members in one direction.

In one form of clutch of the type referred to above the said coacting means constitute pawl and ratchet mechanism comprising at least one pawl carried by the intermediate member and adapted to cooperate with the clutch teeth of the first clutch member, the said clutch teeth thus serving as ratchet teeth of the pawl and ratchet mechanism. In another form of clutch of the type referred to the said coacting means comprise at least one pawl carried by the intermediate member and adapted to cooperate with a ring of ratchet teeth carried by the first clutch member and separate and distinct from the clutch teeth of the first clutch member. In a converse arrangement the pawl or pawls is or are carried by the first clutch member and the ring of ratchet teeth is carried by the intermediate member. In a still further form of clutch of the type referred to the said coacting means comprise one or more magnets carried by the first clutch member and adapted to cooperate with an armature carried by the intermediate member, or, in a converse arrangement, one or more magnets carried by the intermediate member and adapted to cooperate with an armature carried by the first clutch member.

Clutches of the type referred to as hitherto constructed have been arranged to disengage and freewheel for one direction of relative rotation between the first and second clutch members, which direction is always the same for any given clutch, and to engage upon relative rotation of the first and second clutch members in the other direction, which again is always the same for any given clutch.

The object of the present invention is to provide a clutch of the type described which can be selectively assembled for clutch engagement to occur in either one or the other of the two directions of relative rotation of the first and second clutch members as required.

In accordance with the invention there is provided a clutch of the type described in which some of the parts can be disposed selectively in alternative dispositions such that the clutch is capable of transmitting torque in one direction of rotation only or in the other direction only according to the selected disposition of the said parts.

The expression "mutually axially reversed" which will be used herein in relation to the selective positions of parts of the clutch means that in order to change the said part from one disposition to the other it is removed from its supporting member, is reversed axially end for end and is replaced.

Figure 3:
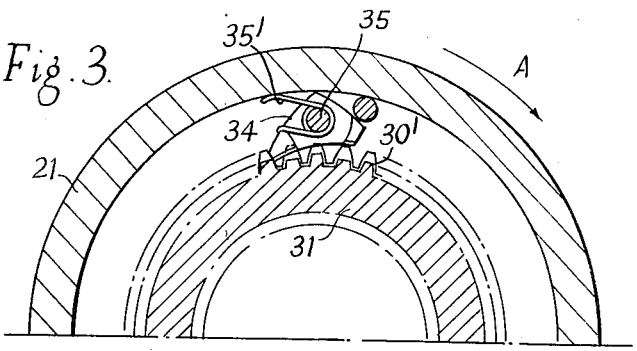
Figure 4:
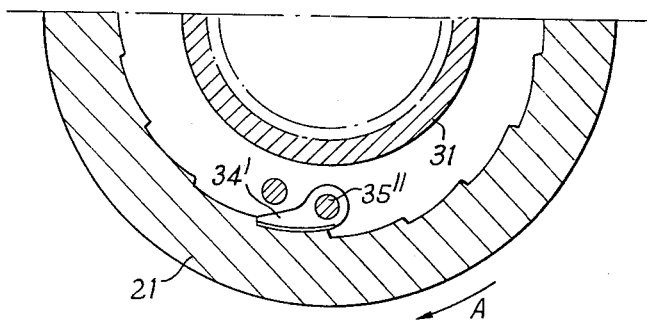
Figure 5:
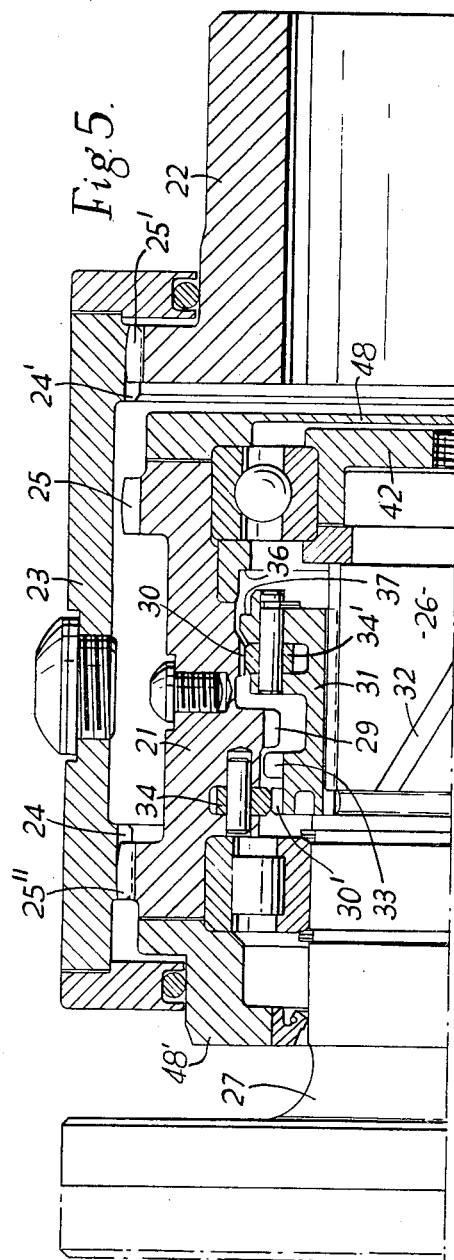
Figure 6:
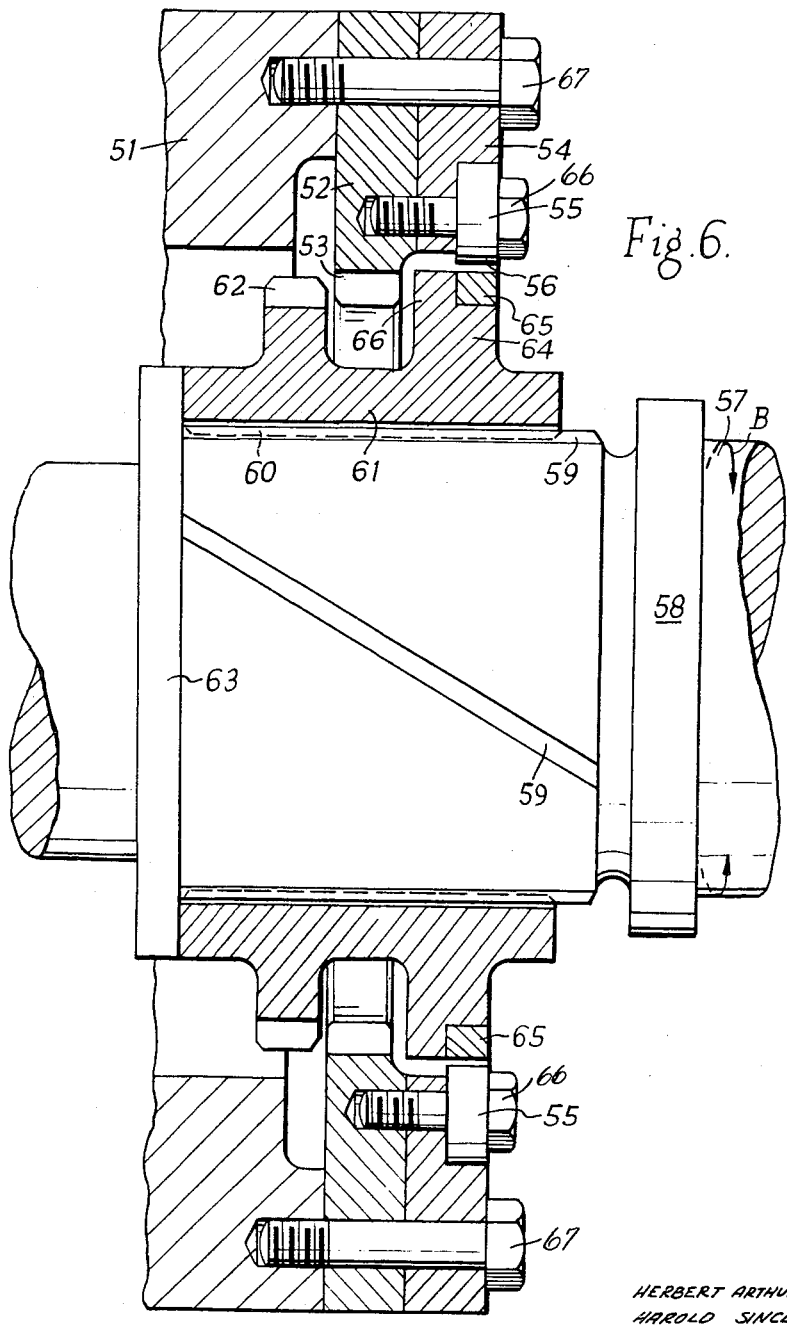
Figure 6A:
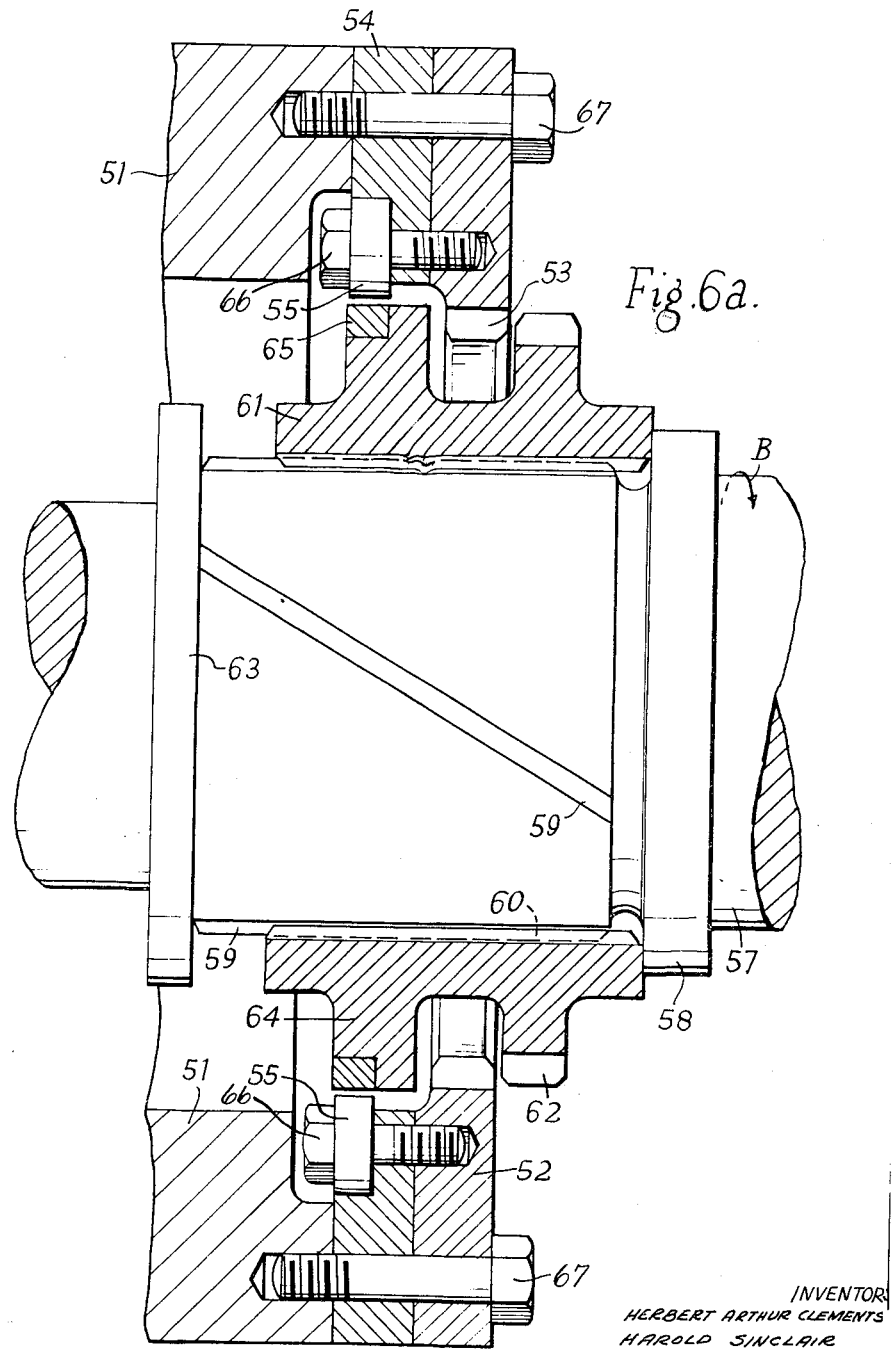
Figure 7:
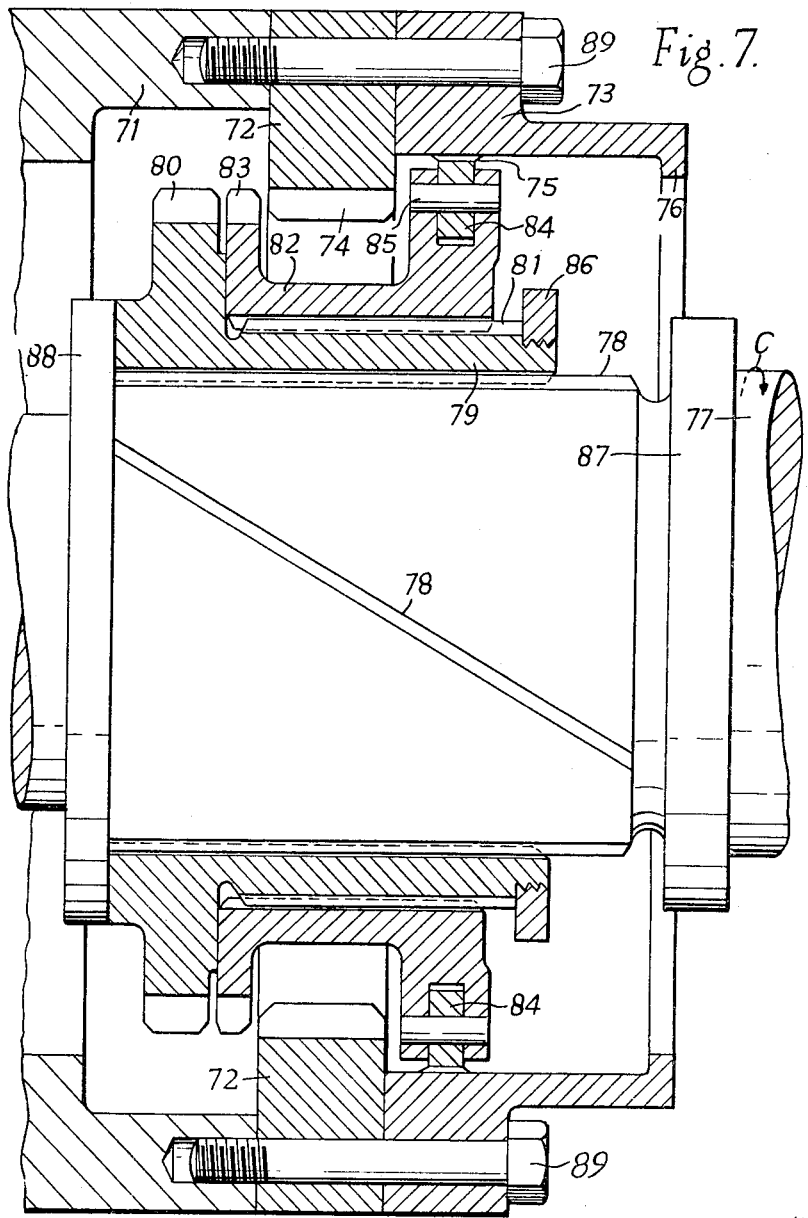
Figure 7A:
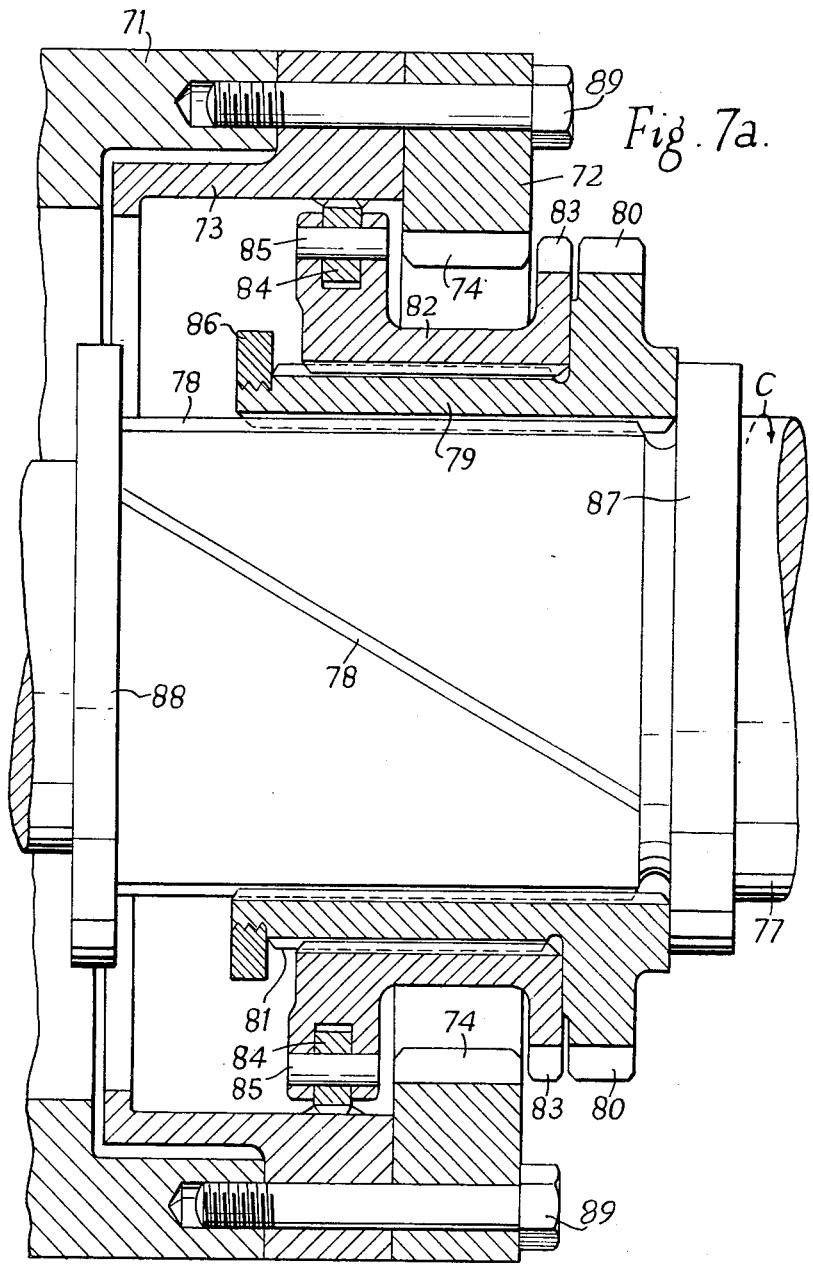

Embodiments of the invention will now be described by way of example with reference to the accompanying drawings, in which:

FIG. 1 is a longitudinal sectional view of a clutch according to the invention in which pawls carried by the intermediate member cooperate with the clutch teeth of the first clutch member, showing the clutch assembled for engagement as a result of relative rotation of the first and second clutch members in one direction, FIG. 1a is a longitudinal sectional view similar to FIG. 1 but showing the clutch assembled for engagement as a result of relative rotation in the opposite direction from that shown in FIG. 1, FIG. 2 is a longitudinal sectional view of another clutch according to the invention, the upper half of the figure showing the clutch in the disengaged condition and the lower half showing the clutch in the engaged condition, FIG. 3 is a cross sectional view on the line 3—3 of FIG. 2, FIG. 4 is a cross sectional view on the line 4—4 of FIG. 2, FIG. 5 is a longitudinal sectional view corresponding to the upper half of FIG. 2, with parts in axially reversed dispositions as compared with the dispositions of the said parts in FIG. 2, FIG. 6 is a longitudinal sectional view of a clutch according to the invention in which magnetic means are provided for initiating clutch engagement, showing the clutch assembled with its reversible parts in one disposition, FIG. 6a is a longitudinal sectional view of a clutch in which magnetic means are provided for initiating clutch engagement, the same as shown in FIG. 6 but showing the clutch assembled with its reversible parts in the other dispositions as compared with the showing in FIG. 6, FIG. 7 is a longitudinal sectional view of a clutch according to the invention in which an auxiliary member mounted on the intermediate member carries pawls that cooperate with ratchet teeth carried by the first clutch member. In FIGURE 7 the clutch is shown assembled with its reversible parts in one disposition, FIG. 7a is a longitudinal sectional view of the clutch shown in FIG. 7 but showing the reversible parts in their other dispositions.

Referring to FIG. 1, the clutch illustrated comprises a cylindrical first clutch member 1 fixed by bolts 13 to the end of a shaft 2 and carrying a ring of internal clutch teeth 3. The second clutch member is a shaft 4 formed with external right-handed helical splines 5 with which engage internal helical splines in an intermediate member 6 which carries clutch teeth 7 and a ring of pawls 8. A split collar 9 and a flange 10 on the shaft 4 serve as stops to limit the helical movement of the intermediate member 6 relative to the shaft 4 and thus define the engaged and disengaged positions of the intermediate member. With the intermediate member disposed as shown, when viewed from the left-hand end of the clutch the noses of the pawls 8 point in clockwise direction. The intermediate member 6 is shown up against the stop 9, viz. in its disengaged position, and so long as the shaft 2 rotates in clockwise direction relative to the shaft 4 (as viewed from the left-hand end of the clutch) the clutch teeth 3 ratchet relative to the pawls 8, which can be of the known spring-biased type like the pawls 34 of FIGURE 3. If the direction of relative rotation is reversed, as by the shaft 2 rotating in anti-clockwise direction, clutch teeth 3 engage pawls 8 and the intermediate member 6 is shifted helically along the shaft 4 into toothed engagement with the first clutch member 1, the clutch teeth 3 and 7 being in full driving engagement when the intermediate member 6 is up against the stop 10.

When it is desired to rearrange the clutch so that it engages when the shaft 2 rotates in clockwise direction relative to the shaft 4, the bolts 11 that secure a ring 12 to the split collar 9 and hold it in place are unfastened, the collar 9 is removed from the clutch, the intermediate member is removed, is turned end to end and replaced, and the collar 9 is then replaced and secured in position. In this case the disengaged position of the intermediate member 6 is up against the stop 10, as shown in FIGURE 1a, and the noses of the pawls 8 point in anti-clockwise direction so that so long as the shaft 2 is rotating in anti-clockwise direction relative to shaft 4 the clutch teeth 3 ratchet relative to the pawls 8, whereas a tendency for shaft 2 to rotate in clockwise direction relative to shaft 4 causes clutch teeth 3 to engage pawls 8 so that the intermediate member 6 is shifted helically into toothed engagement with the first clutch member 1, the clutch teeth 3 and 8 being in full engagement when the intermediate member 6 is up against the stop 9.

It will be observed that the clutch teeth 3 are centrally disposed in the axial sense between the stops 9 and 10 and the dimensions of the intermediate member 6 are such that for either of its dispositions the pawls 8 are disposed centrally between the stops 9 and 10 and can thus cooperate with the clutch teeth 3 when the intermediate member is in its disengaged position.

In a modification (not illustrated) of the clutch described with reference to FIG. 1 the first clutch member 1 carries two sets of engagement initiating elements, viz. rings of ratchet teeth, arranged one on each side of the clutch teeth 3, and the pawls 8 cooperate with one or other ring of ratchet teeth according to the disposition of the intermediate member 6. In this case only the intermediate member has mutually axially reversed dispositions. In a further modification in which only the intermediate member has mutually axially reversed dispositions the intermediate member carries ratchet teeth (which may be clutch teeth) and the first clutch member carries pawls which can be arranged selectively in one or other of two grooves in the first clutch member so that the pawls can be arranged to cooperate with the ratchet teeth with the intermediate member in either of its dispositions.

Referring to FIGS. 2 to 5, the first clutch member comprises a cylindrical part 21, to one end of which an end plate 48 is secured by bolts 49, and to the other end of which an end ring 48' is secured by bolts 49'. The part 21 is drivably connected to a shaft 22 via a sleeve 23 which is located by end rings 44 and 45 secured to it by bolts 46 and 47 and which has internal teeth 24 and 24' engaged with teeth 25 and 25' on the part 21 and shaft 22 respectively. The second clutch member 26 is formed on the end of a shaft 27 and projects into the first clutch member 21 and is journalled therein through axially spaced bearings 28 and 28', the bearing 28 being capable of withstanding axial thrust so as to maintain the desired relative axial positions of the clutch members 21 and 26. The part 21 is formed with a ring of internal clutch teeth 29 and with a ring of internal ratchet teeth 30. The intermediate member is a clutch sleeve 31 formed with internal right-hand helical splines engaged with external splines 32 on the second clutch member 26.

The clutch sleeve 31 is formed with a ring of external clutch teeth 33 which with the clutch fully disengaged (as shown in the upper half of FIG. 2) are to one side of the clutch teeth 29. The clutch sleeve 31 is also formed with a ring of external ratchet teeth 30'. The part 21 carries four primary pawls 34 mounted on pawl pins 35. In the disengaged condition of the clutch the pawls 34 are radially aligned with the external ratchet teeth 30', being urged by springs 35' so that below a predetermined angular speed of the part 21 the noses of the pawls 34 are in ratchetting relationship with the ratchet teeth 30'. The pawls 34 are nose heavy so that when the shaft 22 is rotating above the said predetermined speed the noses of the pawls 34 are urged radially outwardly by centrifugal force so as to move out of engagement with the ratchet teeth 30'. The clutch sleeve 31 carries secondary pawls 34' mounted on pawl pins 35". The pawls 34' have a weight distribution such that when the second clutch member 26 rotates the noses of the pawls 34' are urged outwards by centrifugal force. The part 21 and the clutch sleeve 31 are formed respectively with coacting surfaces 36 and 37 which, as the clutch sleeve 31 moves into its engaged position, cooperate to form an annular dashpot chamber to cushion the engagement of the clutch. When the part 21 rotates with the clutch sleeve 31 in its disengaged position a ring of oil is trapped within the part 21, the oil between the surfaces 36 and 37 serving as a damping medium for the dashpot. The oil in the region of the ratchet teeth 30, which it partially submerges, serves to damp excessive movement of the pawls 34'. An end cap 42 is fixed by bolts 43 to the end of the second clutch member 26 to form a mount for and to clamp the inner race of the bearing 28 in position.

The operation of the clutch as shown in FIG. 2 is as follows:

Assume that the shaft 22 and with it the first clutch member 21 are rotating in the direction indicated by the arrow A (FIG. 2) and that the second clutch member 26 is stationary. Under these conditions the clutch sleeve 31 is in its fully disengaged position in which it is up against an axial stop formed by a ring 41, and below a predetermined angular speed of the first clutch member 21 the primary pawls 34 ratchet relative to the ratchet teeth 30'. Above this speed centrifugal force removes the noses of the pawls 34 from engagement with the ratchet teeth 30'. If now the shaft 27 and with it the second clutch member 26 are accelerated in the direction of arrow A the clutch sleeve 31 rotates with them and centrifugal force acts on the secondary pawls 34' so that their noses are urged radially outwardly into ratchetting relationship with the ratchet teeth 30. Immediately the second clutch member 26 tends to overrun the first clutch member 21, secondary pawls 34' engage ratchet teeth 30 and due to the interaction of the helical splines of the clutch sleeve 31 with those of the second clutch member 26 the clutch sleeve 31 is shifted helically along the second clutch member 26 in the direction (to the left in FIG. 2) to engage its clutch teeth 33 with the clutch teeth 29. The shaft 27 now drives the shaft 22 through the clutch.

If the clutch is initially at rest the shaft 22 can be accelerated by accelerating the shaft 27, in which case the pawls 34 cooperate with the ratchet teeth 30' to move the clutch sleeve 31 into toothed engagement with the part 21.

With the parts 21 and 31 in the dispositions shown in FIG. 2, the clutch will transmit torque from the shaft 27 to the shaft 22 only in the direction shown by the arrow A. When it is desired to rearrange the clutch for the transmission of torque only in the direction opposite to that shown by the arrow A the clutch is dismantled by unscrewing the bolts 43, 46, 47, 49 and 49' and reassembled as shown in FIG. 5. It will be noted that externally the casing 21 is symmetrical about its central radial plane so that when it is reversed teeth 25" thereon engage with the internal teeth 24.

Referring to FIG. 6, the first clutch member 51 has secured thereto by bolts 67 a ring 52 formed with internal clutch teeth 53 and an annular magnet carrier 54 to which are fixed by bolts 66 a plurality of horse shoe magnets 55 arranged in a circular array with their poles 56 directed radially inwards. The second clutch member is a shaft 57 formed with a fixed collar 58 and with right-hand helical splines 59 engaged with internal helical splines 60 in a clutch sleeve 61 carrying a ring of external clutch teeth 62. A removable collar 63 is provided on shaft 57 and the collars 58 and 63 limit the helical movement of the clutch sleeve 61. The clutch sleeve 61 is formed with a flange 64 of ferromagnetic material in which is inset a ring 65 of non-magnetic material, e.g. brass. The coacting end surfaces of the clutch teeth 53 and 62 are smooth and flat.

The operation of the clutch with the parts assembled as shown in FIG. 6 is as follows:

With the second clutch member 57 rotating in the direction shown by the arrow B relative to the first clutch member 51 the clutch sleeve 61 tends to move to the right from the disengaged position shown, due to the axial magnetic force of the magnets 55 on the armature formed by the portion 66 of the flange 64. However, so long as there is appreciable relative rotation between the first and second clutch members eddy currents induced in the ring 65 produce a drag force which opposes the axial magnetic force referred to and which keeps the intermediate member 61 in its disengaged position. If now the first clutch member 51 is accelerated in the direction of the arrow B the eddy current effects will fall off progressively and eventually the axial magnetic force will draw the clutch sleeve 61 to the right until the clutch teeth 62 make smooth nuzzling contact with the clutch teeth 53. When the first clutch member 51 moves through synchronism with the second clutch member 57 the clutch sleeve 61 is drawn into initial toothed engagement with the clutch teeth 53 by the axial magnetic force, clutch engagement being completed by the interaction of the clutch teeth 53 and 62 and the reaction of the helical splines 59 and 60 whereby the clutch sleeve 61 is moved up to the stop formed by collar 58. Torque is then transmitted from the first clutch member 51 to the second clutch member 57 in the direction of arrow B. When the direction of relative rotation of the clutch members 51 and 57 reverses, the interaction of the helical splines and of the clutch teeth causes the clutch to disengage.

When it is desired to rearrange the clutch for the transmission of torque from the first clutch member 51 to the second clutch member 57 only in the direction opposite to arrow B, the bolts 66 and 67 are unscrewed and the clutch is re-assembled as shown in FIG. 6a.

In a modification (not illustrated) of the clutch described with reference to FIG. 6, instead of the two parts 52 and 54 being removable and reversible, the magnets 55 alone can be fixed selectively in alternative positions to either side of the clutch teeth 53 according to the disposition of the intermediate member 61.

Referring to FIG. 7, the first clutch member 71 has rings 72 and 73 secured to it by bolts 89, the ring 72 being formed with internal clutch teeth 74 and the ring 73 being formed with internal ratchet teeth 75 and an oil retaining lip. The second clutch member 77 is formed with external helical splines 78 with which engage internal helical splines in an intermediate member or clutch sleeve 79 which is formed with external clutch teeth 80 and with external helical splines 81 of the same hand as the splines 78. An auxiliary member 82 is formed with internal helical splines engaged with the external splines 81, and is also formed with a ring of auxiliary teeth 83, and carries pawls 84 mounted on pawl pins 85, the pawls 84 being adapted to cooperate with the internal ratchet teeth 75. The pawls 84 are provided with control springs which urge the noses of the pawls radially outwards so that with the clutch assembled as shown in FIG. 7 and with the clutch sleeve 79 and auxiliary member 82 in the positions shown the pawls 84 can ratchet relative to the ratchet teeth 75. Excessive movement of pawls 85 is prevented by the ring of oil which during operation of the clutch is trapped by the lip 76.

The operation of the clutch as shown in FIG. 7 is as follows:

With the second clutch member 77 rotating relative to the first clutch member in the direction of arrow C, the pawls 84 ratchet past the ratchet teeth 75. If now the first clutch member 71 is accelerated in the direction of arrow C, on passage through synchronism ratchet teeth 75 will engage pawls 84 and move the auxiliary member 82 helically to the right so as to bring its teeth 83 into engagement with the clutch teeth 74. The interaction between the teeth 74 and 83 will then shift the auxiliary member 83 further to the right until it abuts a stop 86 on the intermediate member 79, whereupon the continued interaction of the teeth 74 and 83 will cause the auxiliary member 82 to drive the intermediate member 79 helically to the right to initiate toothed engagement of the clutch teeth 80 of the intermediate member 79 with the clutch teeth 74 of the first clutch member 71. This movement continues until the stop 86 comes up against a fixed collar 87 on shaft 77, and the clutch is then fully engaged, torque being transmitted from the first clutch member 71 to the second clutch member 77 in the direction of the arrow C.

When it is desired to rearrange the clutch for the transmission of torque from the first clutch member 71 to the second clutch member 77 only in the direction opposite that shown by arrow C the clutch is dismantled and re-assembled as shown in FIG. 7a, the ring 88 which limits the movement of the intermediate member 79 to the left having a screwthread connection with the clutch member 77 so that it is removable from the second clutch member 77 to permit the removal of the intermediate member 79 and the axuiliary member 82.

We claim:

1. A synchronous self-shifting clutch comprising a first clutch member, a first ring of clutch teeth carried by said first clutch member, a helically splined second clutch member, a helically splined intermediate member carried by said second clutch member with the splines of said intermediate and second clutch members interengaged, axially spaced first and second stop means located to permit limited helical movement of said intermediate member relative to said second clutch member, a second ring of clutch teeth carried by said intermediate member, the clutch comprising coacting means carried respectively by said first clutch member and said intermediate member and adapted, when said intermediate member is against said first stop means to permit free-wheeling of said first and second members upon relative angular movement thereof in one direction and to initiate movement of said intermediate member into a position in which it is in toothed engagement with said first clutch member and against said second stop means upon relative angular movement of said first and second clutch members in the other direction, at least one of said stop means being fitted to the clutch so as to be removable therefrom to permit said intermediate member to be removed from said second clutch member, said rings of clutch teeth and coacting means having dispositions in relation to said intermediate member such that the removal of at least the intermediate member from the clutch and its replacement in an axially reversed disposition relative to its former position provides a synchronous self-shifting clutch in which when the intermediate member is against said second stop means, said coacting means permit free-wheeling in the direction opposite to the former direction and initiate movement of said intermediate member into a position in which it is in toothed engagement with said first clutch member and against said first stop means upon relative angular movement of said first and second clutch members in the direction opposite to said other direction.

2. A synchronous self-shifting clutch comprising a first clutch member, a first ring of clutch teeth carried by said first clutch member, a second clutch member mounted substantially coaxially with said first clutch member, an intermediate member capable of being applied to said second clutch member selectively in alternative mutually axially reversed dispositions relative to said second clutch member, means constraining said intermediate member for helical movement relative to said second clutch member in the same sense for both of said dispositions, first and second stop means defining the axial limits of the said helical movement, the clutch teeth of said first clutch member being centrally disposed in the axial sense between the said first and second stop means, a second ring of clutch teeth carried by said intermediate member, said second ring of clutch teeth being located so that the axial distance from the medial plane of said ring to one end of said intermediate member is substantially equal to the distance from said medial plane to the other end of said intermediate member plus the permitted travel of said intermediate member between said first and second stop means, and pawls carried by said intermediate member, said second ring of clutch teeth and said pawls having dispositions in the axial sense relative to said intermediate member such that when said intermediate member is against the first of said stop means the pawls are located to ratchet relative to the clutch teeth of said first clutch member upon relative rotation in one direction of said first and second clutch members, and to co-operate with the clutch teeth of said first clutch member to initiate engagement of the clutch teeth of said first and intermediate members upon relative rotation in the other direction of said first and second clutch members, said intermediate member being removable from the clutch and replaceable in an axially reversed disposition in which with said intermediate member against the second of said stop means said pawls are located to ratchet relative to the clutch teeth of said first clutch member upon relative rotation of said first and second clutch members in said other direction, and to co-operate with the clutch teeth of said first clutch member to initiate engagement of the clutch teeth of said first and intermediate members upon relative rotation of said first and second clutch members in said one direction.

3. A synchronous self-shifting clutch comprising a first clutch member, a second clutch member mounted substantially coaxially with said first clutch member, an intermediate member carried by said second clutch member, means constraining said intermediate member for helical movement relative to said second clutch member, first stop means defining the limit of said helical movement in one direction, second stop means defining the limit of said helical movement in the other direction, clutch teeth and ratchet teeth carried by a part of said first clutch member, first pawls carried by said part, clutch teeth and ratchet teeth on said intermediate member, second pawls carried by said intermediate member, the relative dispositions of all said clutch teeth, ratchet teeth and pawls being such that when said intermediate member is against one of the said stop means the ratchet teeth of the intermediate member are located to co-operate with said first pawls to initiate clutch engagement upon relative rotation in one direction between said first and second clutch members and said second pawls are located to co-operate with the ratchet teeth of said clutch part to initiate, upon relative rotation in said one direction between said first and second clutch members, movement of said intermediate member relative to said second clutch member to a position of toothed engagement with said first clutch member in which it is against the other of said stop means, said intermediate member and said part being removable from the clutch and replaceable in axially reversed positions in which, when said intermediate member is against the other of said stop means the ratchet teeth of said intermediate member are located to co-operate with said first pawls to initiate clutch engagement upon relative rotation in the other direction between said first and second clutch members, and said second pawls are located to co-operate with the ratchet teeth of said clutch part to initiate clutch engagement upon relative rotation in said other direction between said first and second clutch members, control springs for said first pawls for urging them into positions for co-operating with the ratchet teeth of said intermediate member, said first pawls having weight distributions about their pivot axes such that they are urged out of ratchetting engagement by centrifugal force when said clutch part is rotating at an angular speed above a predetermined speed, and said second pawls having weight distributions about their pivot axes such that they are urged by centrifugal force into ratchetting engagement with the ratchet teeth on said clutch part when said second clutch member is rotating above a predetermined speed.

4. A synchronous self-shifting clutch comprising a first clutch member, a clutch part, clutch teeth and ratchet teeth carried by said clutch part, means for removably securing said clutch part to said first clutch member, a second clutch member, an intermediate member carried by said second clutch member, means constraining said intermediate member for helical movement relative to said second clutch member, first stop means on said second clutch member for defining the limit of said helical movement in one direction, second stop means on said second clutch member for defining the limit of said helical movement in the other direction, clutch teeth carried by said intermediate member, an auxiliary member, auxiliary teeth and pawls carried by said auxiliary member, means constraining said auxiliary member for helical movement relative to said intermediate member in the same sense as the helical movement of said intermediate member relative to said second clutch member, first stop means on said intermediate member for defining the limit of the helical movement of said auxiliary member in one direction, second stop means on said intermediate member for defining the limit of the helical movement of said auxiliary member in the other direction, the relative dispositions of all said clutch teeth, ratchet teeth, auxiliary teeth, pawls and stop means being such that with said intermediate member against said first stop means on said second clutch member and with said auxiliary member against said first stop means on said intermediate member, relative rotation in one direction between said first and second clutch members causes said pawls to ratchet relative to said ratchet teeth, and relative rotation between said first and second clutch members in the other direction causes said pawls and ratchet teeth to engage and thereby shift said auxiliary member helically relative to said intermediate member to initiate engagement of said auxiliary teeth with the clutch teeth of said first clutch member, the continuance of said relative rotation in said other direction causing said auxiliary teeth and the clutch teeth of said first clutch member to interact and move said auxiliary member into engagement with said second stop means on said intermediate member and shift said intermediate member to initiate interengagement of the clutch teeth of said intermediate and first clutch members, said clutch part and said intermediate member being removable from the clutch and replaceable in axially reversed positions such that with said intermediate member against said second stop means on said second clutch member and said auxiliary member against said first stop means on said intermediate member, upon relative rotation of said first and second clutch members in said other direction said pawls ratchet relative to said ratchet teeth and upon relative rotation in said one direction between said first and second clutch members said pawls and ratchet teeth engage to initiate clutch engagement by the above described sequence of events.

References Cited by the Examiner

UNITED STATES PATENTS

| | | |
|---|---|---|
| 2,733,791 | 2/56 | Short. |
| 2,795,964 | 6/57 | Short. |
| 2,876,878 | 3/59 | Sinclair et al. |
| 2,907,431 | 10/59 | Sinclair _____ 74—339 X |
| 2,971,621 | 2/61 | Sinclair et al. |

FOREIGN PATENTS 790,702  2/58  Great Britain.

DAVID J. WILLIAMOWSKY, *Primary Examiner.*

BROUGHTON G. DURHAM, *Examiner.*